US010817029B1

(12) United States Patent
Files et al.

(10) Patent No.: US 10,817,029 B1
(45) Date of Patent: Oct. 27, 2020

(54) INFORMATION HANDLING SYSTEM OBJECT DETECTION AT HOUSING CLOSE EVENT

(71) Applicant: Dell Products L.P., Round Rock, TX (US)

(72) Inventors: Jace W. Files, Round Rock, TX (US); John Trevor Morrison, Round Rock, TX (US); Donald Oliphant, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/540,879

(22) Filed: Aug. 14, 2019

(51) Int. Cl.
*G06F 1/16* (2006.01)
*G01D 5/14* (2006.01)
*G06F 3/0354* (2013.01)
*G06F 3/03* (2006.01)

(52) U.S. Cl.
CPC .......... *G06F 1/1677* (2013.01); *G01D 5/145* (2013.01); *G06F 1/1641* (2013.01); *G06F 1/1643* (2013.01); *G06F 1/1669* (2013.01); *G06F 1/1681* (2013.01); *G06F 3/0321* (2013.01); *G06F 3/03546* (2013.01)

(58) Field of Classification Search
CPC .... G06F 1/1666; G06F 1/1669; G06F 1/1677; G06F 1/1681; G06F 1/1641; G06F 1/1643
See application file for complete search history.

(56) References Cited

U.S. PATENT DOCUMENTS

| 7,221,330 | B2* | 5/2007 | Finke-Anlauff | G06F 1/1616 345/1.1 |
| 7,864,517 | B2* | 1/2011 | Miller | G06F 3/016 361/679.27 |
| 2013/0205142 | A1* | 8/2013 | Jung | G06F 1/1677 713/300 |
| 2014/0184489 | A1* | 7/2014 | Ma | G06F 3/0354 345/156 |
| 2018/0210508 | A1* | 7/2018 | Aurongzeb | G06F 1/1652 |
| 2019/0041919 | A1* | 2/2019 | Makinen | G06F 1/1618 |

* cited by examiner

*Primary Examiner* — Nidhi Thaker
(74) *Attorney, Agent, or Firm* — Zagorin Cave LLP; Robert W. Holland

(57) ABSTRACT

A portable information handling system having a display on each of opposing rotationally coupled housing portions monitors for objects disposed on a display and takes corrective action if the housing portions rotate to a closed position that impacts the object on an opposing display. For instance, a keyboard or stylus placed on one display is detected by the touchscreen, by Hall sensors, by IR sensors and or other sensors. The rotational position and angular velocity of the housing portions are tracked and analyzed to take corrective action if the housing portions will reach a closed position in less than a predetermined time. The corrective action may include visual and audible warnings and/or braking at a hinge that works against hinge rotation to slow or stop impact by the object and display.

18 Claims, 6 Drawing Sheets

INFORMATION HANDLING SYSTEM OBJECT DETECTION AT HOUSING CLOSE EVENT

BACKGROUND OF THE INVENTION

Field of the Invention

The present invention relates in general to the field of portable information handling systems, and more particularly to an information handling system object detection at housing close event.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display, an input device and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that rotationally couple to each other so that the system converts between closed and open positions. For example, a main housing portion integrates processing components and a keyboard and rotationally couples with hinges to a lid housing portion that integrates a display. In a clamshell position, the lid housing portion rotates approximately ninety degrees to a raised position above the main housing portion so that an end user can type inputs at the integrated keyboard while viewing the display. In a tablet position, the keyboard rotates under the display to provide the user with access to the touchscreen similar to that of a tablet information handling system. After usage, convertible information handling systems rotate the lid housing portion closed over the main housing portion to protect the keyboard and display, thus reducing the system footprint for improved storage and mobility.

Recently, convertible information handling systems have been introduced that dispose a display across the upper surface of both housing portions instead of integrating a keyboard in one upper surface. In some instances, two separate liquid crystal displays (LCDs) are used, one on each housing portion, while in other instances a foldable organic light emitting diode (OLED) display film is disposed across both housing portions. In either case, an integrated touchscreen supports use of one of the housing portion displays as a virtual keyboard while the other housing portion display is held in an elevated viewing position by a clamshell orientation of the housing portions. One advantage of a dual display convertible information handling system is that a larger effective viewing area is available when the housing portions rotate to a tablet mode having both displays in the same plane. Another advantage is that removal of the keyboard helps to reduce the height of the information handling system. More specifically, keyboards tend to increase height of one housing portion so that vertical room is available for key travel. Typically, convertible information handling systems build processing components in the main housing portion that holds the keyboard since the increased weight helps to stabilize the convertible information handling system in the clamshell mode. As a result, the main housing portion has a greater height and the lid housing portion tends to remain thin with just the integrated display. In contrast, dual display portable information handling systems tend to have housings of symmetric height. By disposing processing components across the multiple housings, height may be further reduced and thermal management improved.

One difficulty with two display convertible information handling systems is that end user's tend to prefer physical keyboards for making inputs over virtual or touchscreen keyboards. As a result, dual display convertible information handling systems typically include a portable wireless keyboard, such as a Bluetooth keyboard, which can rest on one of the displays to imitate a clamshell position of a convertible information handling system with an integrated keyboard. When not in use, these peripheral wireless keyboards typically store on the outside of the housing, such as in a fabric sleeve or by magnetic attachment. In addition to a peripheral keyboard, dual display convertible information handling systems also tend to include a stylus with an active tip that allows an end user to write directly on a touchscreen display surface. An active stylus provides increased touch accuracy by increasing capacitance at the touch tip. The stylus is typically stored in a sleeve formed in the housing or a fabric cover coupled to the housing.

Since dual display information handling systems have driven housing thickness to minimal levels, some risk of damage exists to the displays if the housings are not robust enough to resist torsional forces introduced during normal usage. Yet, due to the minimal housing thickness and tight hinge constraints, portable information handling system housings tend to have precise and light weight mechanical support that struggles when excessive unintended forces are applied. One source of such unexpected forces can include an end user unintentionally rotating the housing portions to a closed position when a keyboard or stylus is located on one of the dual displays. An object left between the displays when the housing portions rotate to a closed position can not only bind and break hinges that rotationally couple the housing portions but also flex the housing portion material itself, resulting in cracking or other damage to one or both integrated displays.

SUMMARY OF THE INVENTION

Therefore, a need has arisen for a system and method which detects objects on an information handling system display during a housing closing event.

In accordance with the present invention, a system and method are provided which substantially reduce the disadvantages and problems associated with previous methods and systems for managing portable information handling system housing closing events. A display is monitored to detect objects disposed on the display at a housing closing event. Corrective action to help reduce or prevent damage to the display is initiated when the risk of damages approaches a threshold, such as based upon a rotational position and angular velocity of information handling system housing portions.

More specifically, a portable information handling system processes information with processing components, such as a processor and memory, disposed in a housing having opposing rotationally coupled housing portions. Each housing portion has a display disposed at an upper surface, such as a first liquid crystal display (LCD) panel disposed over the first housing portion and a second LCD panel over the second housing portion. An end user may interact with the processing components by touch inputs at a touchscreen integrated with the LCD panels. Alternatively, an end user may interact with the processing components using a keyboard and/or stylus, such as by placing a keyboard on an LCD panel when the housing portions are in a clamshell position and removing the keyboard before rotating the housing portions to a closed position. Detection sensors monitor the display surface to detect objects disposed on the display, such as a keyboard detected by a Hall sensor aligned with a magnet or a stylus detected by a touchscreen monitoring for the capacitive touch tip. Rotation sensors monitor for the housing portion relative rotational orientation and angular velocity. If a close event is detected by the rotation sensors, such as by a threshold time to a closed state based upon rotational orientation and angular velocity, while an object is on a display positioned to collide with a display, then the information handling system takes corrective action, such as by sounding an audible alert, presenting a visual alert, initiating a haptic alert and/or altering hinge operation to resist rotation to the closed position.

The present invention provides a number of important technical advantages. One example of an important technical advantage is that a dual display information handling system is actively monitored for a close event that may result in damage to the information handling system by an object disposed between closing housing portions. If a close event is detected, an end user is warned of the risk of damage before the housing closes over the object to introduce stress to the housing mechanics and the dual displays. For instance, housing portion relative position and motion is analyzed to determine that an impact with an object is threatened before the impact takes place. In various embodiments, an end user is warned of potential damage to the information handling system with an audible warning, a haptic alert, a visual cue at the display, and/or alteration in the operation of the information handing system hinge that works against motion closing the housing portions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system monitors angular velocity of housing portion rotation towards a closed position to take corrective action that helps prevent damage to a display by an object disposed between the housing portions. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
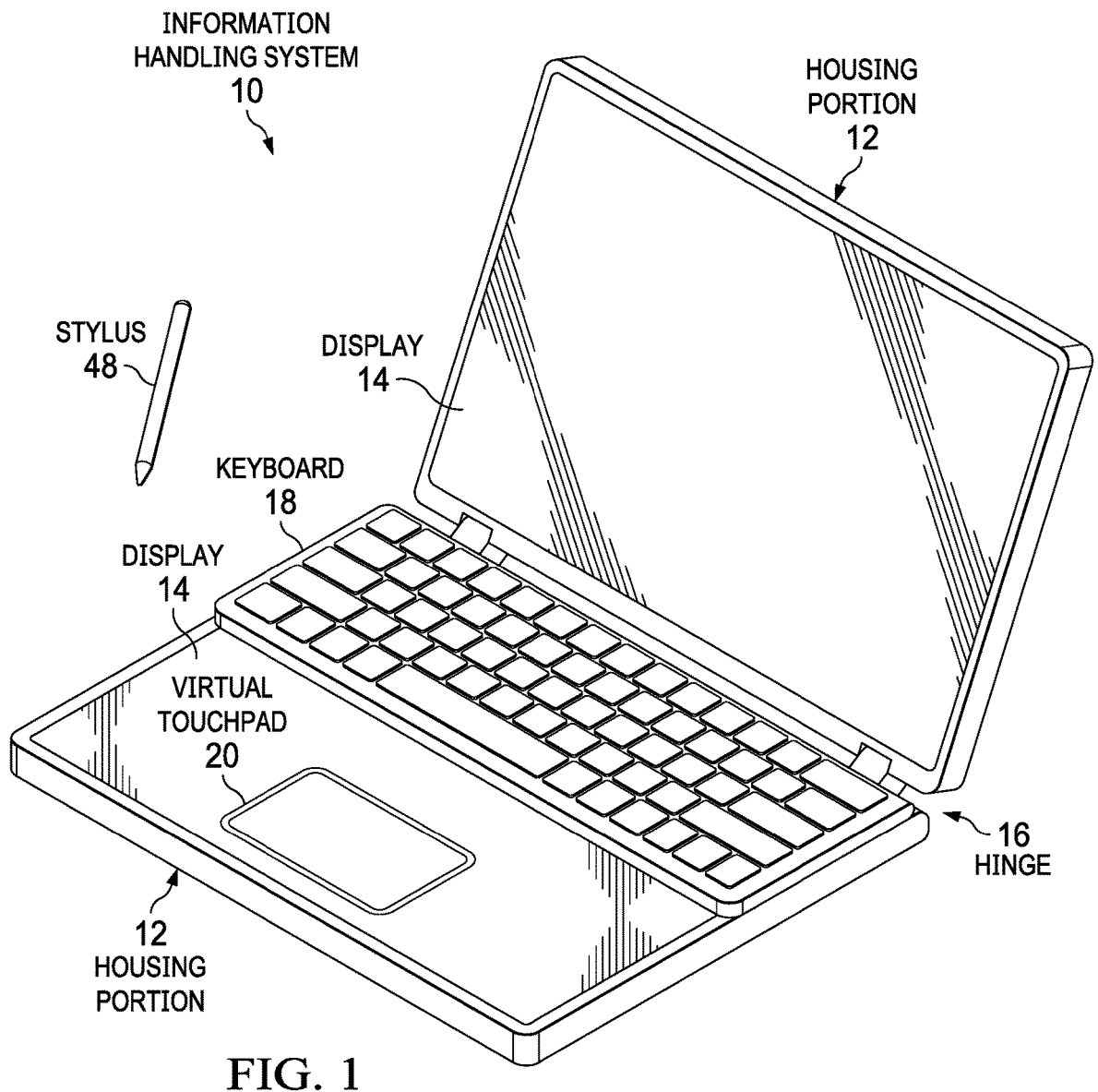
FIG. 1 depicts an upper perspective view of a portable information handling system having a dual display and a peripheral keyboard placed at an inner portion of a horizontally disposed display.

Referring now to FIG. 1, an upper perspective view depicts a portable information handling system 10 having a dual display 14 and a peripheral keyboard 18 placed at an inner portion of a horizontally disposed display 14. Information handling system 10 has a portable housing built with opposing housing portions 12 rotationally coupled by a hinge 16 to rotate between at least a closed position having displays 14 in proximity to each other and a table position having displays 14 oriented in the same plane. In the example embodiment, portable information handling system 10 rests on a support surface in a clamshell position with displays 14 rotated to a substantially perpendicular orientation. A horizontally oriented display 14 has a peripheral keyboard 18 disposed on its upper surface and a virtual touchpad 20 presented for the end user to interact with. The horizontally disposed display 14 acts as a base that holds a vertically oriented display 14 in a viewing position.

In operation, an end user interacts with dual display portable information handling system 10 in a manner similar to a conventional convertible portable information handling system. For instance, keyboard 18 is held in position with magnets to simulate an integrated keyboard and communicates inputs to the information handling system through wireless signals, such as Bluetooth. The horizontally disposed display 14 provides another input surface by touch inputs, such as with a finger at virtual touchpad 20 or by a stylus 48. Stylus 48 provides more precise input touches, such as with an active capacitive tip, that allows an end user to write or draw on either of displays 14. When an end user finishes with inputs, removing keyboard 18 allows housing portions 12 to rotate to a closed position about hinge 16 for a minimal footprint that enhances mobility and storage of the system.

Figure 2:
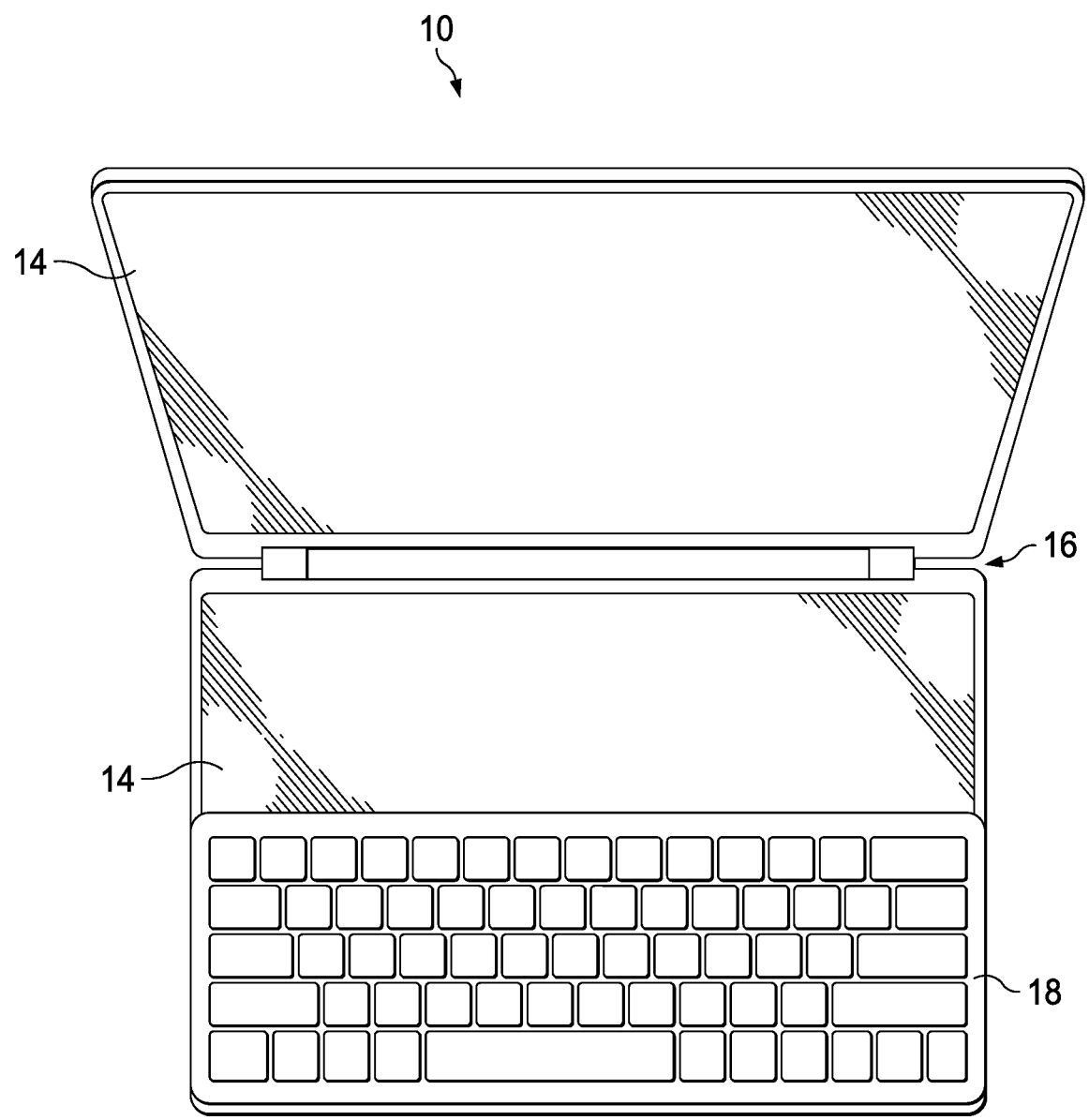
FIG. 2 depicts an upper view of the dual display portable information handling system having the peripheral keyboard placed at an outer portion of a horizontally disposed display.

Referring now to FIG. 2, an upper view depicts the dual display 14 portable information handling system 10 having the peripheral keyboard 18 placed at an outer portion of a horizontally disposed display 14. In the example embodiment, keyboard 18 has slid to the front of display 14 to offer the end user a different typing position and free up the rear portion of the horizontally disposed display 14 to accept touch inputs or present visual information. In one example embodiment, opposite polarity magnets disposed in the horizontally disposed display 14 define the forward and rear positions of keyboard 18. In some cases, the end user may remove keyboard 18 from display 14 entirely for use as a separate peripheral keyboard. When finished with keyboard 18, magnets integrated in keyboard 18 can store keyboard 18 at the back side of a housing portion 12. Although the example embodiment depicts two separate LCDs, one on each of housing portions 12, in alternative embodiments, a single foldable organic light emitting diode (OLED) display may extend across both housing portions 12 by folding at hinge 16 when housing portions 12 rotate to a closed position. A difficulty that can arise with one or more display disposed over both housing portions 12 is that an end user can forget to remove keyboard 18 from display 14 and then attempt to close the housing portions 12 over top of keyboard 18.

Figure 3:
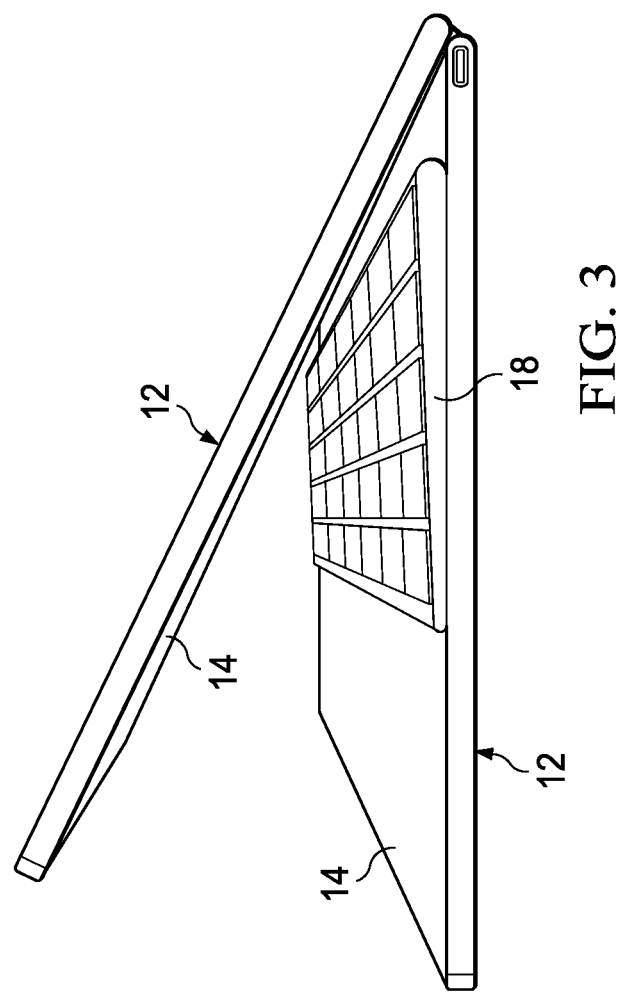
FIG. 3 depicts a side view of the portable information handling system approaching a closed position at which the vertically disposed display rotates toward a horizontal orientation to impact against a keyboard disposed on the horizontally disposed display.

Referring now to FIG. 3, a side view depicts the portable information handling system 10 approaching a closed position at which the vertically disposed display 14 rotates toward a horizontal orientation to impact against a keyboard 18 disposed on the horizontally disposed display 14. If pressure is placed on housing portions 12 to continue towards the closed position, damage can occur in a number of ways. For instance, flexure of a housing portion 12 translate to the display 14 integrated in it, which can lead to cracking or breaking of the display 14. As another example, force applied at a housing portion once rotation is stopped by keyboard 18 can lead to hinge 16 failure. A similar set of damages and failures may occur if a stylus 48 or other object is left between housing portions 12 moving towards a closed position.

Figure 4:
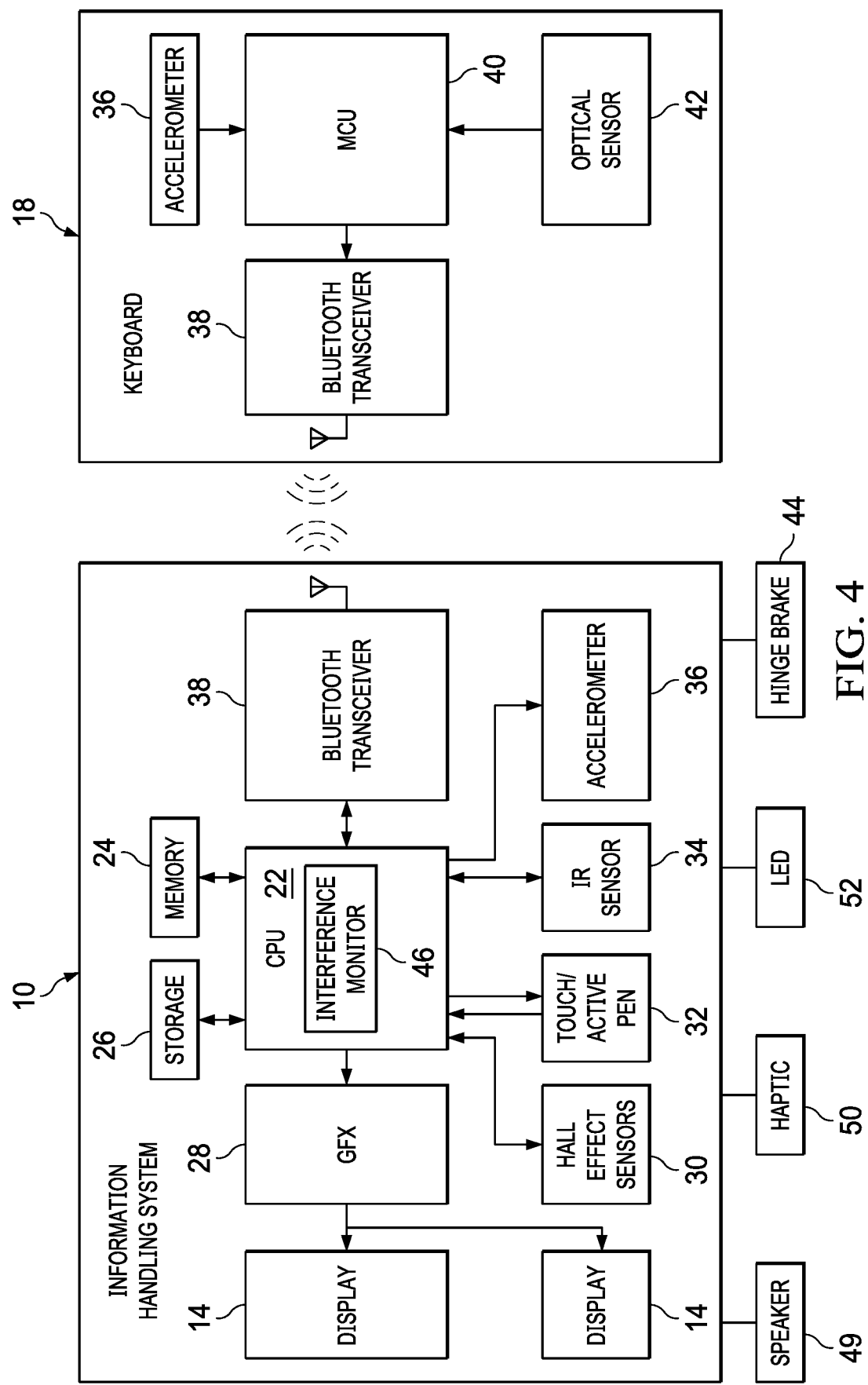
FIG. 4 depicts a block diagram of an information handling system configured to detect an object on a display and to take responsive corrective action.

Referring now to FIG. 4, a block diagram depicts an information handling system 10 configured to detect an object on a display 14 and to take responsive corrective action. In the example embodiment, a central processing unit (CPU) 22 cooperates with a memory 24, such as a random access memory (RAM), to execute instructions that process information, such as instructions of an operating system and/or applications retrieved from persistent storage 26. The instructions generate information that is provided to a graphics processor (GFx) 28 to generate pixel values that define visual images for presentation at displays 14. A plurality of sensors interface with CPU 22, such as through an Integrated Sensor Hub (ISH) available in INTEL processors. In alternative embodiments other processing components may support sensor interactions with CPU 22, such as an embedded controller. In the example embodiment, the plural sensors include a Hall effect sensor 30, a touch active pen sensor 32, an infrared (IR) sensor 34 and an accelerometer 36.

The plural sensors cooperate with an interference monitor 46 executing on CPU 22, such as embedded code retrieved from non-transient memory for execution by an ISH, to help prevent damage associated with an information handling system close event. For example, a Hall Effect sensor 30 senses the presence of a keyboard 18 on a display 14, such as by the proximity of a magnet in the keyboard to Hall Effect sensor 30. As another example, a touch active pen sensor 32 detects finger touches and stylus touches at a display 14, such as with an integrated capacitive touchscreen. For instance, a keyboard 18 or stylus 48 left on a display 14 may be detected by comparing the detected touch footprint with an expected touch footprint stored in local memory, such as the ISH. In the case of a stylus, a unique footprint may be generated by the active tip, which creates a "hover" effect when not physically touching a display 14, as may happen if stylus 48 lays on its side. For instance, detection of a stylus laying on the display may be based upon a hover height that approximates a radius of stylus 48. An infrared sensor 34, such as a time of flight sensor, scans the area just over top of each display to detect if objects lay on the display surface. In the case of touch active pen sensor 32 and IR sensor 34, objects other than an expected keyboard 18 or stylus 48 may be detected. Accelerometer sensors 36 detect accelerations at the housing portions 12, including relative orientation to gravity. In some embodiments, accelerometers 36 are packaged in sets of different axes to act as a gyroscope that detects rotation. By disposing accelerometers in opposing housing portions 12, a comparison of accelerations between the housing portions 12 provides resolution of movement of housing portions 12 relative to each other, such as occurs when housing portions 12 rotate about hinge 16.

In the example embodiment, keyboard 18 communicates with information handling system 10 through wireless signals, such as provided by Bluetooth transceivers 38. Keyboard 18 includes accelerometers 36, which provide accelerations for comparison to those detected at housing portions 12, a microprocessor control unit 40 to coordinate operations related to keyboard functions and an optical sensor 42 that detects key inputs. In various alternative embodiments, keyboard 18 may include additional sensors that aid in coordination of operation of interference monitor 46, such as with a Hall Effect sensor to detect an information handling system magnet or other sensors that can provide output to interference monitor 46 through Bluetooth transceivers 38.

Interference monitor 46 monitors conditions provided by the plural sensors and initiates corrective measures if a close event is predicted to occur over top of an object disposed on a display 14 that can cause damage to the display 14 and/or information handling system 10. Interference monitor 46 leverages conditions sensed by the plural sensors to detect a keyboard, stylus or other object on a display 14 and, when the housing portions are moving towards a closed position, provides one or more corrective measures, such as a visual, audible or haptic feedback at the information handling system 10 and/or, if available, at the object on the display 14.

The visual, audible and/or haptic feedback is actuated to warn the end user that an obstruction is present on the display 14 that could result in damage if the housing moves to a closed position. In the example embodiment, a speaker 49 sounds an audible alarm, such as siren or a spoken warning: "Object On Display!!" A haptic device 50 creates a vibration that translates to an end user touch, such as a vibration on the housing portion 12 that an end user is rotating. Alternatively, haptic vibration may be provided at the display on which the keyboard or stylus rests and/or in the keyboard or stylus itself. An LED 52 illuminates to catch the end user's attention, such as at the housing or the object caught in the close event. In one example embodiment, the entire display 14 may flash a warning, such as by flashing red then black in sequence. In another example embodiment, the audible, visual and haptic alerts may provide a reminder to the end user to remove a keyboard or stylus when the end user turns off information handling system 10 and before housing portion closing movement is detected.

In one example embodiment, a hinge brake 44 interfaces with interference monitor 46 and hinge 16 to adjust the resistance of hinge 16 to rotation when an object is detected on a display 14. For example, hinge brake 44 increases friction applied against rotation of hinge 16 if an object is detected so that an end user has a more difficult time rotating housing portions 12 towards the closed position. Alternatively, hinge brake 44 locks hinge 16 to prevent rotation when an object is present on a display 14. In one example embodiment, hinge brake 44 engages as soon as an object is detected on a display 14 so that housing portion rotation is more difficult and relaxes when an object 14 is removed. In another example embodiment, if an object is on display 14 at power down of information handling system 10, hinge brake 44 locks in place to prevent hinge 16 rotation; once an attempt to rotate hinge 16 is detected, interference monitor 46 initiates to check if the object is detected and releases hinge brake 44 if the object was removed. For example, upon detection of a force at hinge 16, an interrupt to CPU 22 ISH initiates a scan with IR sensor 34 to determine if objects are present on display 14. Other indications of an object present at a close event as described above may be provided in addition to the application of hinge brake 44. In another example embodiment, in order to save power object collision monitoring may be disabled or performed on a less frequent basis where the likelihood of an object collision is minimal, such as when the housing portions are rotated from a landscape to a portrait mode in which gravity would cause objects to fall of their own accord off of display 14.

Figure 5:
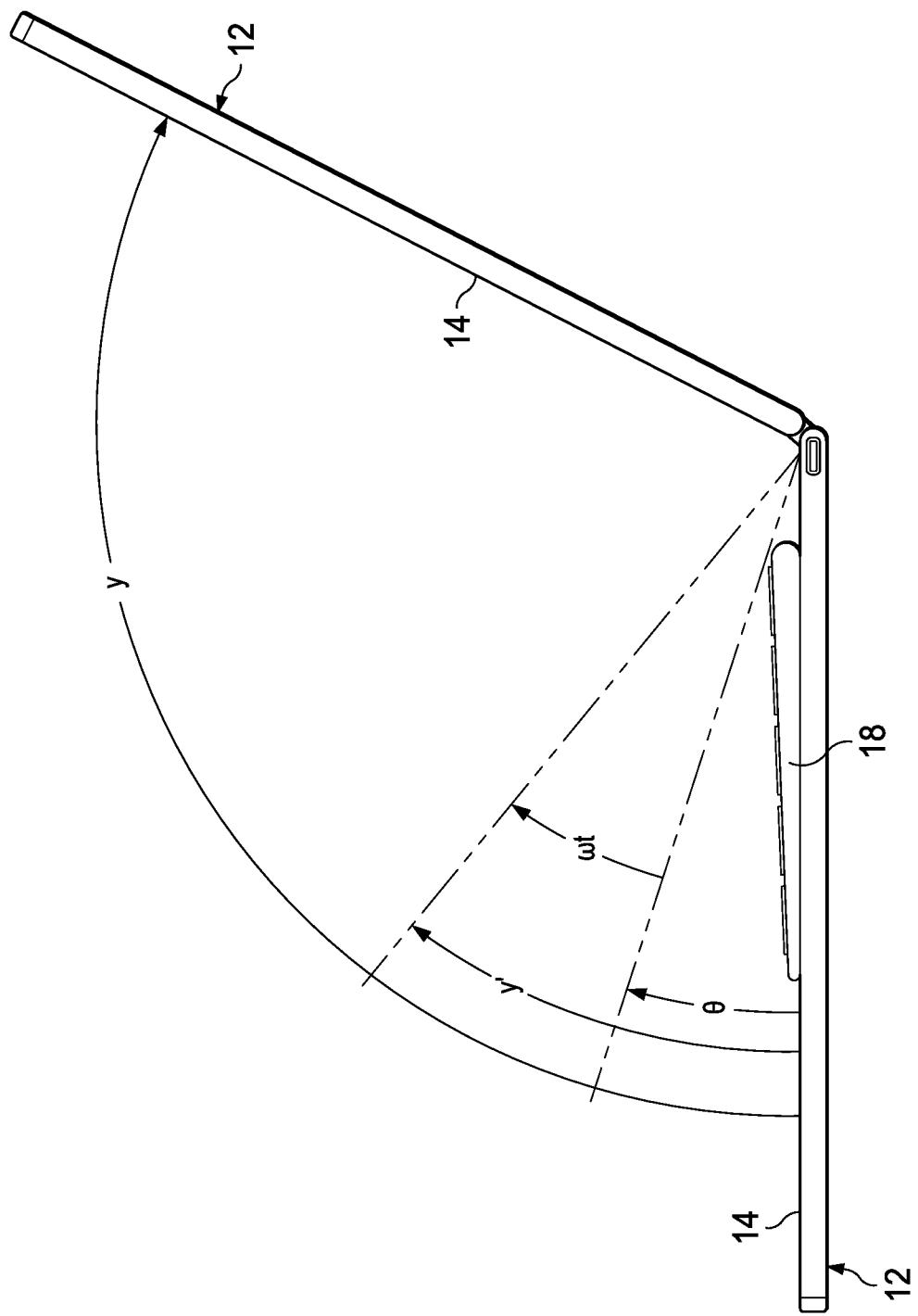
FIG. 5 depicts a side view of an information handling system illustrating application of angular position and angular velocity to detect a threshold time until impact of a display against an object.

Referring now to FIG. 5, a side view depicts an information handling system 10 illustrating application of angular position and angular velocity to detect a threshold time until impact of a display 14 against an object, such as keyboard 18. Interference monitor 46 ideally provides warning of a close event associated with housing portions 12 a predetermined time before a display 14 impacts an object; however, such as warning relies upon an estimate of the height and location of the object on display 14. In one example embodiment, a time until collision with a keyboard 18 is determined based upon a known height of the keyboard and a known location, such as is provided by touches at the touchscreen of detection provided by Hall Effect sensors located in different places on display 14. Similarly, a height of stylus 48 is provided by the diameter of the stylus and the location is provided by a touch location on display 14. In such situations, an angle THETA $\Theta$ is set that is associated with an anticipated object collision. If an object height is unknown, $\Theta$ may be estimated based upon an estimated height. Alternatively, $\Theta$ may be set at zero with an increased time until collision used at which corrective action is taken. A total open angle GAMMA $\gamma$ is provided from a rotation sensor, such as comparison of accelerations detected at housing portions 12 or a measurement of hinge rotational position taken by a rotational sensor interfaced with hinge 16. A threshold time until impact with an object is provided when an angle GAMMA prime $\gamma'$ is detected. The angle $\gamma'$ until impact is provided as a function of angular velocity OMEGA $\omega$ multiplied by the time threshold needed for corrective action t. In mathematical equations, close detection referencing FIG. 5 is provided by:

$$\omega = \theta/t \quad \text{Angular Velocity:}$$

When the hinge angle is at a threshold at which the angular velocity $\omega$ will result in display 14 touch at an object within the threshold time $T_{(th)}$ the alert is asserted. In the example, the alert issues at $\gamma'$ where the angle $\gamma'$ varies based upon the angular velocity of the housing portions moving towards the closed position:

$$\gamma(t) = \theta + \omega t$$

$$\lambda(T_{(th)}) = \gamma' = \theta + \omega * T_{(th)}$$

As an example, with a keyboard collision at angle $\theta$ of 15 degrees, if the warning time $T_{(th)}$ is one second and the housing portions as detected by accelerometer-based gyroscopes rotates towards a closed position at an angular velocity $\omega$ of 30 degrees per second, then a warning for corrective action would issue at:

$$\gamma'(1) = \theta + \omega * T_{(Th)} = 15 + 30 * 1 = 45 \text{ degrees}$$

Thus, in the example, when the housing portions 12 reach 45 degrees to the closed position, a corrective action is initiated so that the end user has one second to react before a collision of display 14 and the object takes place. In various embodiments, various arrangements of warning times and angles may be used to provide sufficient end user warning. For example, in an off state with a keyboard place on display 14, additional warning time may be provided due to lag in responsiveness of the ISH and sensors in detecting and analyzing a close event.

Figure 6:
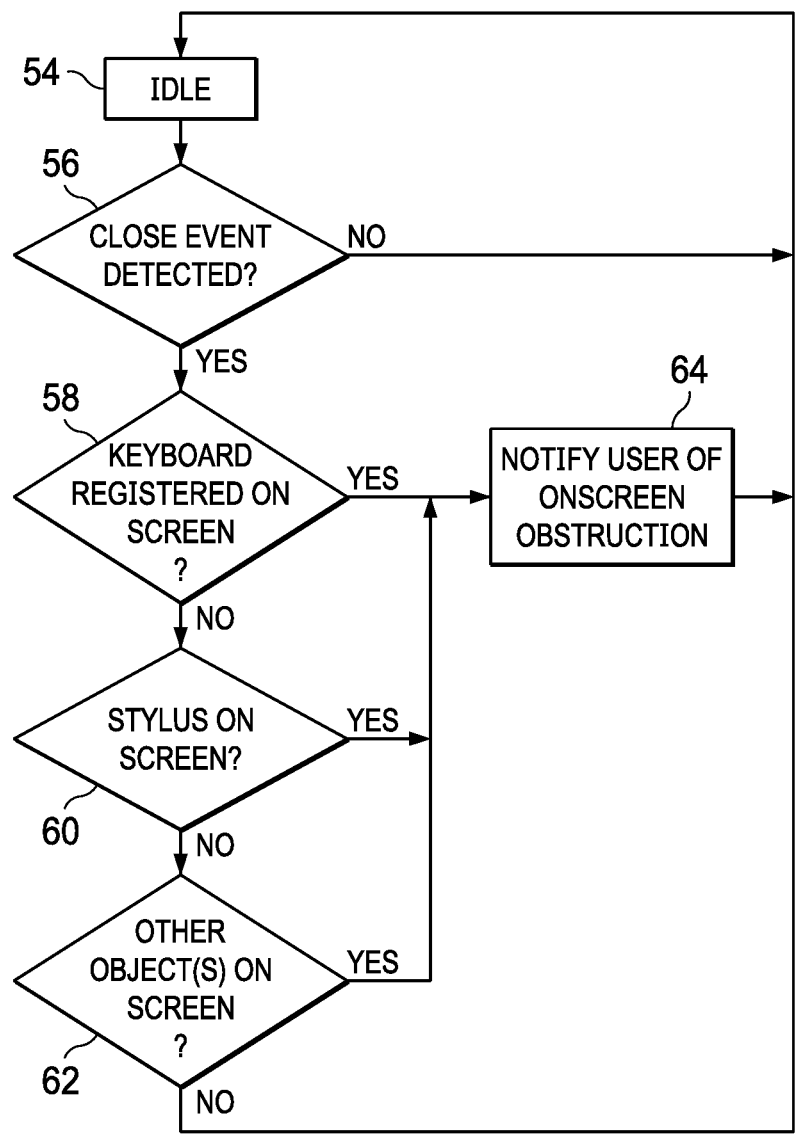
FIG. 6 depicts a flow diagram of a process for detecting impact of an object against a display and responsive corrective action.

Referring now to FIG. 6, a flow diagram depicts a process for detecting impact of an object against a display and responsive corrective action. The process starts at step 54 in an idle state and periodically cycles to step 56 to determine if a close event is detected. If at step 56 a close event is detected, the process continues to step 58 to determine if the keyboard is registered as present on the display. If not, the process continues to step 60 to determine if a stylus is on the display. If not, the process continues to step 62 to determine if any other objects are disposed on the display. If no objects are on the display, the process returns to step 54 to monitor for a close event. If at steps 58, 60 or 62 an object is detected at the display, the process continues to step 64 to issue a warning to the end user. In one alternative embodiment, once an object is detected on a display 14, the object height is applied to estimate an angular orientation and angular velocity associated with a collision by the display with the object and that estimate is used to determine the close event at step 56.

Although the present invention has been described in detail, it should be understood that various changes, substitutions and alterations can be made hereto without departing from the spirit and scope of the invention as defined by the appended claims.

What is claimed is:

1. An information handling system comprising:
a housing having first and second portions;
a hinge rotationally coupling the housing first and second portions to rotate between at least closed and tablet positions;
plural processing components disposed in the housing and operable to process information;
one or more displays disposed over the housing, the one or more displays exposed at the upper surface of the first and second housing portions;
one or more detection sensors integrated in the housing and operable to detect an object on one or more of the one or more displays;
a rotation sensor operable to detect rotation of the first and second housing portions relative to each other; and
an interference monitor interfaced with the one or more detection sensors and the rotation sensor, the interference monitor operable to predict impact of a housing portion and the object as occurring within a predetermined time threshold and, in response, to command a corrective action.

2. The information handling system of claim 1 wherein:
the object comprises a keyboard placed on one of the one or more displays, the keyboard having a magnet; and
the one or more detection sensors comprises a Hall sensor disposed in the housing and operable to detect the magnet.

3. The information handling system of claim 1 wherein:
the object comprises a stylus; and
the one or more detection sensors comprises a touchscreen integrated in the one or more displays.

4. The information handling system of claim 1 wherein:
the rotation sensor comprises a first accelerometer on the first housing portion and a second accelerometer on the second housing portion; and
the interference monitor comprises logic that compares accelerations of the first and second accelerometers to detect angular velocity of the first and second housing portions about the hinge.

5. The information handling system of claim 1 further comprising:
a hinge brake interfaced with the hinge and operable to adjust resistance of the hinge to rotation;
wherein the corrective action comprises a command to apply the hinge brake to increase resistance of the hinge to rotation.

6. The information handling system of claim 1 wherein the corrective action comprises activation of a haptic device at the housing.

7. The information handling system of claim 1 wherein the corrective action comprises sounding an audible alert with a speaker.

8. The information handling system of claim 1 wherein:
the one or more detection sensors comprise an infrared sensor aligned to detect objects on one or more of the one or more displays.

9. The information handling system of claim 1 wherein the one or more displays comprise a first liquid crystal display disposed over the first housing portion and a second liquid crystal display disposed over the second housing portion.

10. A method for protecting an information handling system integrated display, the method comprising: monitoring the display to detect one or more objects on the display; monitoring a housing to detect predetermined angular velocity of housing portions to a closed position in which the display contacts the one or more objects; and in response to detecting the predetermined angular velocity, performing a corrective action; wherein the monitoring the housing further comprises: detecting an angle of rotation of the housing from a closed position; and issuing a command for the corrective action when the angle of rotation and angular velocity provide a threshold time until rotation to the closed position completes.

11. The method of claim 10 wherein the monitoring the display to detect one or more objects on the display further comprises:
detecting motion of the housing towards a closed position; and
in response to the detecting motion, scanning the display surface with an infrared sensor.

12. The method of claim 10 further comprising:
detecting the housing in a portrait mode; and
in response to the detecting the housing in a portrait mode, disabling the monitoring the display.

13. The method of claim 10 wherein the performing corrective action further comprises increasing resistance against rotation of the housing.

14. The method of claim 10 wherein the performing corrective action further comprises generating a haptic response at the housing.

15. The method of claim 10 wherein the performing corrective action further comprises presenting a warning at the display.

16. A system for protecting a display from damage by an object, the system comprising: a detection sensor operable to detect the object on the display; a rotation sensor operable to detect a predetermined rotation condition of first and second housing portions; and non-transitory memory storing an interference monitor operable to execute on a processor to perform a corrective action when an object is detected on the display with the predetermined rotation condition; wherein the predetermined rotation condition comprises an angular velocity and rotational orientation of the first and second housing portions associated with achieving a closed position of the first and second housing portions within a predetermined time.

17. The system of 16 wherein: the object comprises a keyboard held in place on the display by magnets; and the detection sensor comprises a Hall switch.

18. The system of 16 wherein: the object comprises an active stylus having a capacitive tip; and the detection sensor comprises a touchscreen display.

* * * * *